United States Patent
Hwang et al.

(10) Patent No.: US 8,614,692 B2
(45) Date of Patent: Dec. 24, 2013

(54) TOUCH SCREEN MODULE WITH PROTECTOR WINDOW

(75) Inventors: Jeong-Ho Hwang, Seoul (KR); Sang-Min Yi, Suwon-si (KR); Sang-Hee Lee, Hwaseong-si (KR)

(73) Assignee: Samsung Display Co., Ltd. (KR)

( * ) Notice: Subject to any disclaimer, the term of this patent is extended or adjusted under 35 U.S.C. 154(b) by 344 days.

(21) Appl. No.: 12/724,258

(22) Filed: Mar. 15, 2010

(65) Prior Publication Data

US 2010/0245273 A1    Sep. 30, 2010

(30) Foreign Application Priority Data

Mar. 27, 2009  (KR) .................. 10-2009-0026249

(51) Int. Cl.
*G06F 3/045* (2006.01)
*G02F 1/1335* (2006.01)

(52) U.S. Cl.
USPC .......................................... 345/174; 349/12

(58) Field of Classification Search
USPC .......... 349/12; 178/18.01; 345/156, 173–174, 345/87, 104
See application file for complete search history.

(56) References Cited

U.S. PATENT DOCUMENTS

| | | | |
|---|---|---|---|
| 5,990,874 A * | 11/1999 | Tsumura et al. | 345/173 |
| 6,636,203 B1 * | 10/2003 | Wong et al. | 345/173 |
| 8,031,275 B2 * | 10/2011 | Lee | 349/12 |
| 2002/0054030 A1 * | 5/2002 | Murphy | 345/173 |
| 2006/0134431 A1 * | 6/2006 | Yasuda et al. | 428/411.1 |
| 2007/0070047 A1 * | 3/2007 | Jeon et al. | 345/173 |
| 2008/0198143 A1 | 8/2008 | Kinoshita et al. | |
| 2008/0302642 A1 * | 12/2008 | Tatehata et al. | 200/317 |
| 2010/0053112 A1 * | 3/2010 | Chen | 345/174 |
| 2010/0053532 A1 * | 3/2010 | Lai | 349/151 |

FOREIGN PATENT DOCUMENTS

| | | | |
|---|---|---|---|
| CN | 001356226 A | | 7/2002 |
| CN | 1942853 A | | 4/2007 |
| JP | 2004302546 | * | 10/2004 |
| KR | 1020040056817 A | | 7/2004 |
| KR | 20010085231 | * | 3/2005 |
| KR | 1020060085878 A | | 7/2006 |
| KR | 1020070089356 A | | 8/2007 |

* cited by examiner

*Primary Examiner* — Kenneth Bukowski
(74) *Attorney, Agent, or Firm* — Innovation Counsel LLP

(57) ABSTRACT

A touch screen module which includes an LCD panel working as a touch screen, a protector window disposed over the LCD panel, and an adhesive to affix the protector window to the LCD panel. The LCD panel may be a hybrid Touch Screen Pad (hTSP) type touch screen and have a first substrate comprising a first surface on which a plurality of switching elements are formed, a second substrate comprising a second surface that faces the first surface, and liquid crystal material disposed between the first surface and the second surface. The protector window may have a plurality of pressing patterns on a third surface facing the second substrate. In operation, pressure from a touch applied to the protector window engages the pressing patterns against the second substrate, transferring touch pressure to the second substrate as well.

11 Claims, 3 Drawing Sheets

TOUCH SCREEN MODULE WITH PROTECTOR WINDOW

PRIORITY STATEMENT

This application claims priority under 35 U.S.C. §119 to Korean Patent Application No. 2009-26249, filed on Mar. 27, 2009 in the Korean Intellectual Property Office (KIPO), the contents of which are herein incorporated herein by reference in their entirety.

TECHNICAL FIELD

The present disclosure relates to touch screens, and more particularly relates to touch screen modules having patterned protector windows, for use in touch screens.

BACKGROUND

Since a user of a device to which a touch screen is mounted can input an order or information on the screen itself, touch screens are particularly suitable to a Graphic User Interface (GUI) and the use of touch screens as an input device is generally easier than use of a mouse or a keyboard. Accordingly, touch screens have been used in various devices such as cellphones, PDAs, public information providing devices installed at airports, government offices, etc.

In a hybrid Touch Screen Pad (hTSP) type touch screen (such as a register type or a capacitor type touch screen), pressure from a touch is detected by the LCD panel itself FIG. 1 shows an example of an hTSP type touch screen (100). The hTSP type touch screen (100) includes a TFT substrate (110) having a plurality of Thin Film Transistors (TFTs) (not shown), an opposite substrate (120), and liquid crystal material (130). In addition, the hTSP type touch screen (100) has a plurality of column spacers (140) to maintain the gap between the TFT substrate (110) and the opposite substrate (120), and a plurality of conductive spacers (150, 151) which sense touches on the opposite substrate (120).

As can be seen from FIG. 2, when an hTSP type touch screen (100) is mounted to a set (10) like a cellphone or a PDA, a protector window (200) is disposed over the touch screen to protect the screen from impact. However, this protector window worsens the sensitivity of the hTSP type touch screen.

SUMMARY

One embodiment of the present disclosure provides a touch screen module comprising an hTSP type touch screen, which in turn comprises a first substrate having a first surface on which a plurality of switching elements are formed, a second substrate having a second surface, the second surface facing the first surface, and a liquid crystal material positioned between the first surface and the second surface. The touch screen also includes a protector window positioned over the second substrate. The protector window includes a base substrate having a third surface facing the second substrate, and a plurality of pressing patterns on the third surface.

In another embodiment of the present disclosure, a touch screen module comprises an hTSP type touch screen comprising means to detect pressure applied to a surface of the hTSP type touch screen, and a protector window being located over the surface and comprising means to transfer pressure applied to the protector window to the surface of the hTSP type touch screen.

BRIEF DESCRIPTIONS OF THE DRAWINGS

The above and other objects and advantages of the present disclosure will become more apparent by describing in detail exemplary embodiments thereof in reference to the attached drawings in which.

DETAILED DESCRIPTION

Hereinafter, embodiments of the present disclosure will be described in detail with reference to the drawings.

Figure 1:
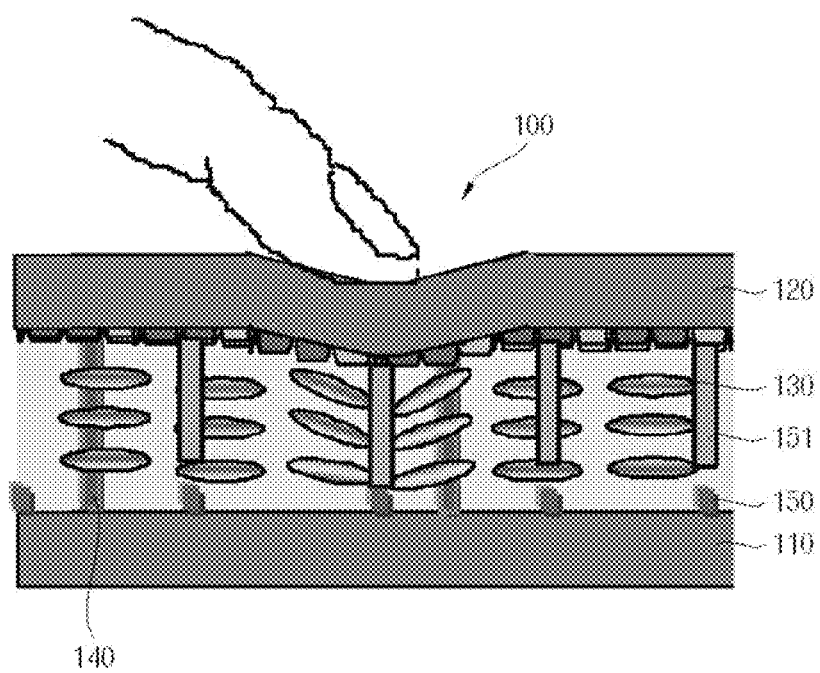
FIG. 1 is a sectional view of an LCD panel working as a touch screen.
Figure 2:
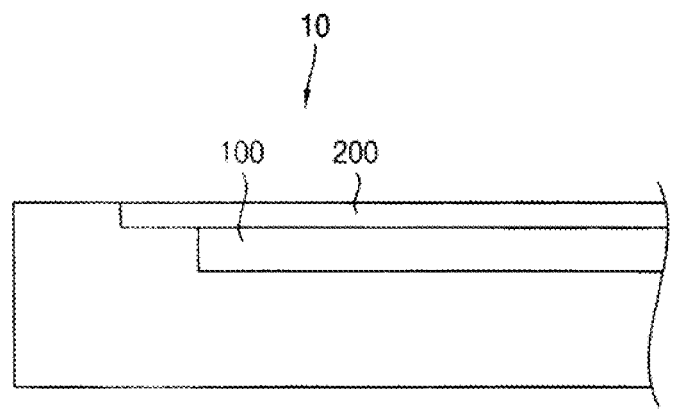
FIG. 2 is a sectional view of a set including an LCD panel working as a touch screen.
Figure 3:
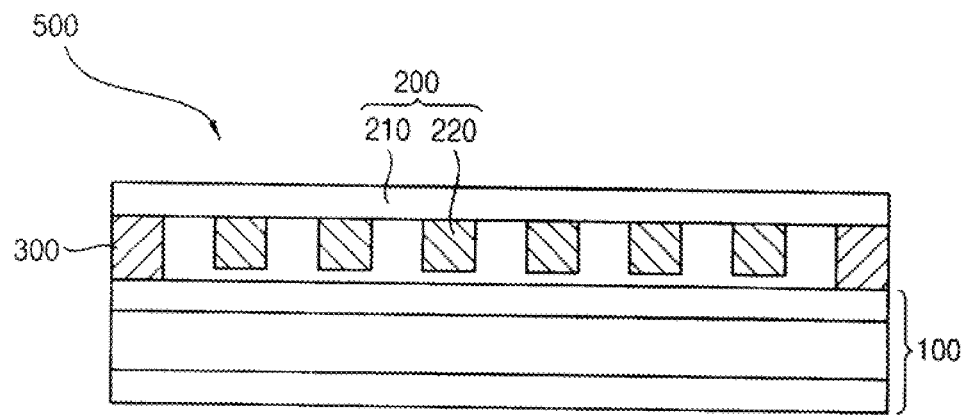
FIG. 3 is a sectional view of a touch screen module according to an embodiment of the present disclosure.
Figure 4:
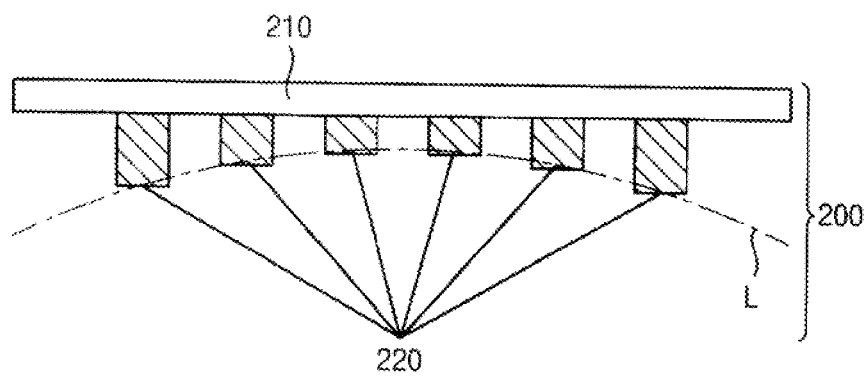
FIG. 4 is a sectional view of a protector window in a touch screen according to an embodiment of the present disclosure.

Here, an embodiment of a touch screen module (500) is described referring to FIGS. 1, 3 and 4. A touch screen module (500) includes an LCD panel (100), a protector window (200), and an adhesive (300). The LCD panel (100) has a first substrate (110) having a first surface on which a plurality of switching elements, such as Thin Film Transistors (TFTs) (not shown), are formed, and a second substrate (120) having a second surface that faces the first surface. The LCD panel (100) further includes liquid crystal material (130) disposed between the first surface and the second surface. The protector window (200) is disposed over the second substrate (120). The protector window has a base substrate (210) having a third surface with a plurality of pressing patterns (220) on the third surface and facing the second substrate (120). When the surface of the base substrate (210) opposite to the third surface is pressed, the base substrate deflects. The pressing patterns (220) then contact the second substrate (120), thereby applying pressure to the LCD panel (100).

The adhesive is disposed between the LCD panel (100) and the protector window (200) to fix the protector window to the LCD panel. The adhesive (300) may be a tape made of materials which can be attached both to a plastic material like PolyCarbonate (PC), Polyethylene Terephthalate (PET), Polymethyl Methacrylate (PMMA), and to a glass.

The LCD panel (100) may be an hTSP type touch screen. The LCD panel (100) may have a first conductive spacer (150) that protrudes from the first surface of the first substrate (110), and a second conductive spacer (151) that protrudes from the second surface of the second substrate (120) over the first conductive spacer (150) and is separate from the first conductive spacer. There may be a plurality of first conductive spacers (150) and as many second conductive spacers (151). Accordingly, pressure applied to the second substrate (120) deflects the second substrate (120), pressing some of the second conductive spacers (151) against their corresponding first conductive spacers (150).

The base substrate (210) and the pressing patterns (220) may be integrally formed. They may be manufactured by molding. Further, the base substrate and/or the pressing patterns may comprise any one of PET, PC and PMMA.

In some embodiments, the base substrate (210) may include PET and the thickness of the base substrate (210) may be about 0.3 mm. It was found that when a base substrate (210) made of PET is thinner than 0.25 mm, the protector window warps under some high temperature/high humidity conditions that may be expected in normal operation. However, it was also found that when the base substrate (210) is thicker than 0.35 mm, the pressure applied to the protector window will not be sufficiently passed to the hTSP type touch screen (100), resulting in deterioration of sensitivity.

Some of the pressing patterns (220) may be shorter than other pressing patterns. In some embodiments of the invention, pressing patterns (220) closer to the center of the base substrate (210) may be shorter than pressing patterns (220) disposed closer to the boundary of the base substrate (210).

The pressing patterns (220) may be shaped generally cylindrically.

With reference to FIG. 4, in some embodiments, an imaginary line L, formed by the lower surfaces, or ends, of the pressing patterns (220), may be substantially circular. Here, 'substantially circular' may include a circular shape, an elliptical shape, a parabolic shape, and a hyperbolic shape. This 'substantially circular' shape, where the pressing patterns (220) at the center portion of the base substrate (210) are short, may prevent the center portion of the base substrate (210) from being unintentionally pressed to be acknowledged touched.

The density of pressing patterns may be determined at least partially by the size and resolution of an hTSP touch screen. If pressing patterns are distributed too densely, the substantial aperture ratio of the touch screen module may be decreased, which aperture ratio is the measure of transparent portion through which light passes. If pressing patterns are distributed too sparsely, the touch screen may not be sufficiently sensitive.

While the present disclosure illustrates some exemplary embodiments, it should be understood that the presentation of the embodiments is not to restrict the scope of the disclosure into the embodiments, and that various changes, substitutions and alternations can be made without departing from the spirit and scope of the disclosure which includes the appended claims.

What is claimed is:

1. A touch screen module comprising:
   a hybrid Touch Screen Panel (hTSP) type touch screen comprising:
      a light-passing first substrate having a first surface on which a plurality of switching elements are formed,
      a light-passing second substrate having a second surface, the second surface being disposed above, spaced apart from and facing the first surface in a manner such that a corresponding spacing is defined between the first and second substrates, and
      a liquid crystal material positioned in the corresponding spacing defined between the first and second substrates wherein the combination of the first and second substrates and the interposed liquid crystal material provides an operative Liquid Crystal Display (LCD); and
   a light-passing and elastically deformable protector window positioned on top of the second substrate of the operative LCD, the protector window comprising a base substrate having a third surface that is spaced apart from and facing the second substrate, and the protector window further comprising a plurality of pressing patterns integrally formed on the third surface and protruding downwardly therefrom toward the second substrate, the pressing patterns being normally spaced apart from the second substrate when the protector window is in a nondeformed normal state thereof and the pressing patterns being normally spaced apart one from the other.

2. The touch screen module of claim 1, wherein the hTSP type touch screen further comprises a first conductive spacer protruding from the first surface, and a second conductive spacer protruding from the second surface toward the first conductive spacer, the second conductive spacer spaced apart from the first conductive spacer.

3. The touch screen module of claim 1, wherein the pressing patterns are integrally formed with the base substrate.

4. The touch screen module of claim 1, wherein the base substrate and the pressing patterns comprise at least one of PolyCarbonate (PC), Polyethylene Terephthalate (PET), and Polymethyl Methacrylate (PMMA).

5. The touch screen module of claim 1, wherein the base substrate comprises PET, and wherein a thickness of the base substrate is about 0.3 mm.

6. The touch screen module of claim 1, wherein the plurality of pressing patterns comprises at least one pressing pattern having a length shorter than other ones of the pressing patterns.

7. The touch screen module of claim 1, wherein a pressing pattern proximate to a center of the third surface has a length shorter than that of a pressing pattern proximate to an edge of the third surface.

8. The touch screen module of claim 7, wherein each of the pressing patterns has a first end facing the third surface and a second end opposite to the first end, and wherein the first ends of the pressing patterns lie along an arcuate shape.

9. The touch screen module of claim 1, wherein at least one of the pressing patterns is generally cylindrical.

10. The touch screen module of claim 1, wherein the protector window is affixed to the hTSP type touch screen with an adhesive.

11. The touch screen module of claim 10, the adhesive comprises a tape comprising a material which can be attached to at least one of PolyCarbonate (PC), Polyethylene Terephthalate (PET), and Polymethyl Methacrylate (PMMA).

* * * * *